Feb. 5, 1952     I. E. BOTVIN ET AL     2,584,540

COLOSTOMY POUCH

Filed Jan. 27, 1950

INVENTORS
Irving Botvin
BY Theodore Torman
Nathaniel Frucht
ATTORNEY

Patented Feb. 5, 1952

2,584,540

UNITED STATES PATENT OFFICE 2,584,540

COLOSTOMY POUCH

Irving E. Botvin and Theodore Torman,
Providence, R. I.

Application January 27, 1950, Serial No. 140,848

2 Claims. (Cl. 128—283)

The present invention relates to medical appliances, and has particular reference to a novel construction for a colostomy pouch.

The principal object of the invention is to provide a colostomy pouch with a detachable body engaging ring element.

An additional object of the invention is to utilize a plastic ring element for a colostomy pouch, the ring element having a convex facing.

A further object of the invention is to provide a simple and effective lock seal for locking the plastic ring element to the pouch body.

With the above and other objects and advantageous features in view the invention consists of a novel arrangement of parts more fully disclosed in the detailed description following, in conjunction with the accompanying drawings, and more specifically defined in the claims appended thereto.

It has been found desirable to provide a colostomy pouch with a detachable plastic ring, the ring being lock sealed to the pouch, which is preferably of pure gum rubber, by a rubber lock band. The preferred plastic for the ring is methyl methacrylate, and the ring has a convex facing which is held in a perfect seal to the body by applying a thin coat of rubber cement to both the ring facing and the skin area around the ileostomy, the coats of rubber cement being allowed to dry before the pouch is applied to the skin.

Figure 1:
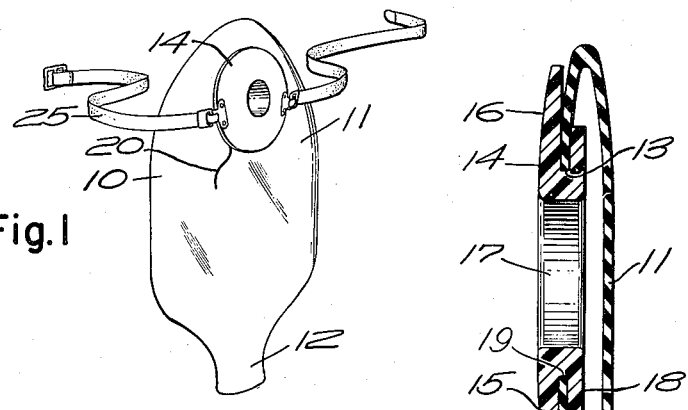
Fig. 1 is an illustrative view showing the colostomy pouch and strap.
Figure 2:
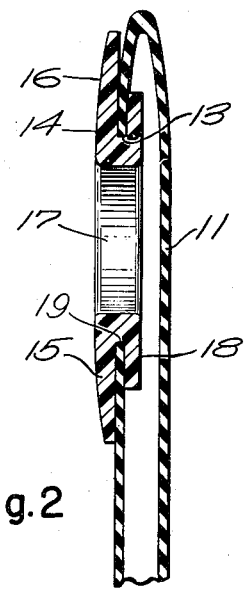
Fig. 2 is an enlarged sectional detail showing the initial mounting of the ring on the pouch body.
Figure 3:
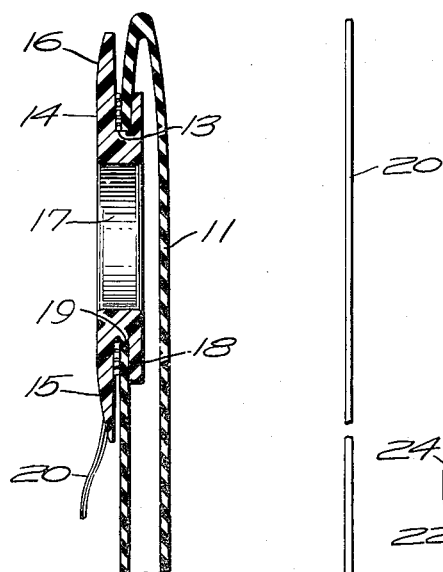
Fig. 3 is a view similar to Fig. 2, showing the lock wrapping of the rubber band.
Figure 4:
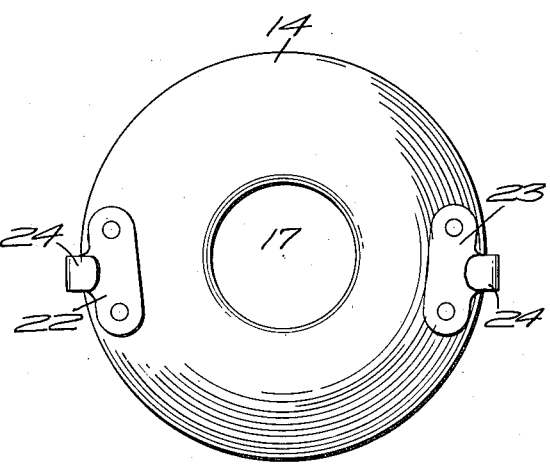
Fig. 4 is an enlarged view of the ring face.
Figure 5:
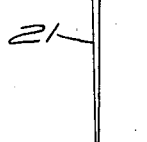
Fig. 5 is a view of the rubber lock band.

Referring to the drawings, the colostomy pouch 10 includes a body or bar 11, preferably of pure gum rubber, which may have a waste disposal outlet 12. The body is provided with an opening 13 at the upper end, to receive a ring element 14; the ring element has an outer annular disk 15 with a convex outer facing 16, a central passageway 17, and an inner annular flange 18, a narrow annular groove 19 being positioned intermediate the outer disk 15 and the inner flange 18 for receiving the edges of the opening 13. A rubber band 20, see Fig. 5, with a tapered end 21, is wound three or four times into the groove 19 between the contiguous faces of the disk 15 and the pouch body 10 as shown in Fig. 3, to provide a lock seal.

The outer facing 16 of the disk 15 has two diametrically opposed tabs 22, 23 mounted thereon, each tab having a tongue 24 for detachably receiving the end of an adjustable strap 25. The bag 11 may be made in any suitable manner by molding or dipping, or by vulcanizing the outer edges of two sheets of rubber which have been cut to the desired length.

The above described construction provides a simple colostomy pouch which can be used for colostomy or ileostomy patients, as the ring can be made with different size passageways. The parts may be readily separated for cleaning or replacement, and the convex facing for the ring element has been found effective for providing a perfect body seal.

Although we have disclosed a specific constructional embodiment of the invention, it is obvious that changes in the size, shape and arrangement of the parts and in the material used for the parts may be made to comply with different design requirements, without departing from the spirit or the scope of the invention as defined in the appended claims.

We claim:

1. In a colostomy pouch, a body portion having an opening, a ring element having a passageway and an annular groove receiving the edges of said opening, and lock means for removably locking the edges in the groove, said lock means comprising a rubber band.

2. In a colostomy pouch, a body portion having an opening, a ring element having a passageway and an annular groove receiving the edges of said opening, and lock means for removably locking the edges in the groove, said lock means comprising a rubber band, said ring element having a convex outer facing.

IRVING E. BOTVIN.
THEODORE TORMAN.

REFERENCES CITED

The following references are of record in the file of this patent:

UNITED STATES PATENTS

| Number | Name | Date |
|---|---|---|
| 2,441,508 | Porcell | May 11, 1948 |
| 2,496,175 | Perry | Jan. 31, 1950 |

FOREIGN PATENTS

| Number | Country | Date |
|---|---|---|
| 215,015 | Germany | Oct. 21, 1909 |